Figure 5:
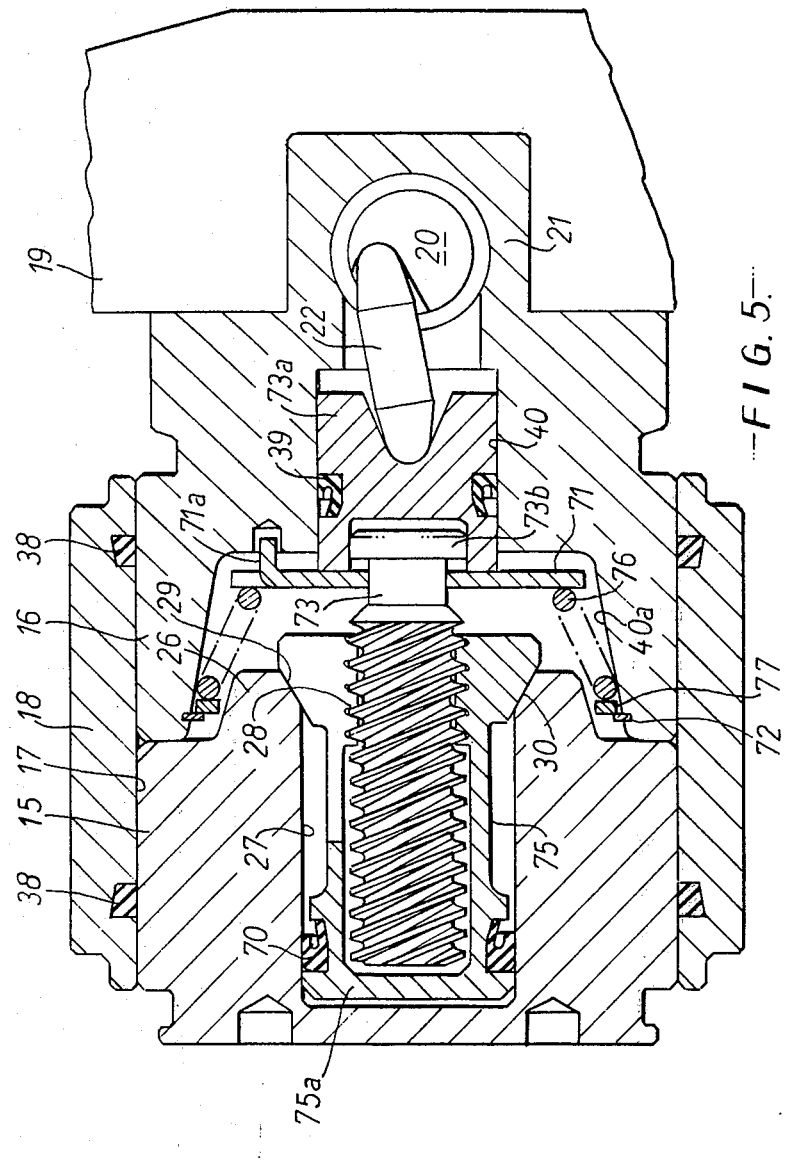

United States Patent [19]
Asquith

[11] 3,952,845
[45] Apr. 27, 1976

[54] BRAKE ADJUSTERS
[75] Inventor: Anthony Asquith, Nuneaton, England
[73] Assignee: Girling Limited, Birmingham, England
[22] Filed: Feb. 18, 1975
[21] Appl. No.: 550,717

[30] Foreign Application Priority Data
Feb. 16, 1974 United Kingdom.............. 7157/74

[52] U.S. Cl.............................. 188/196 D; 188/71.9
[51] Int. Cl.²........................................ F16D 65/56
[58] Field of Search............................ 188/71.7–71.9, 188/79.5 P, 79.5 GE, 196 BA, 196 D, 202, 203

[56] References Cited
UNITED STATES PATENTS
| | | | |
|---|---|---|---|
| 2,246,873 | 6/1941 | Browall | 188/196 D |
| 3,838,757 | 10/1974 | Farr | 188/196 D X |

*Primary Examiner*—Duane A. Reger
*Attorney, Agent, or Firm*—Scrivener Parker Scrivener and Clarke

[57] ABSTRACT

A slack adjuster for a vehicle braking system includes first and second members having a normally reversible screw-thread connection therebetween. The first and second members are disposed between first and second pistons respectively of the braking system and excessive displacement of the pistons causes relative displacement between said first and second member to reduce the displacement of the pistons on the succeeding stroke. One of the first and second members may be a slit or split nut and a wedge member can be provided for urging the slit or split nut against the other of the first and second members to prevent relative rotation therebetween under a brake-applying thrust. The slit or split nut is resiliently biased against the other of the first and second members to prevent undesired relative rotation at the screw-thread connection. The slit nut can be formed as a spring-biased piston designed to prevent over-adjustment due to brake deflection.

23 Claims, 7 Drawing Figures

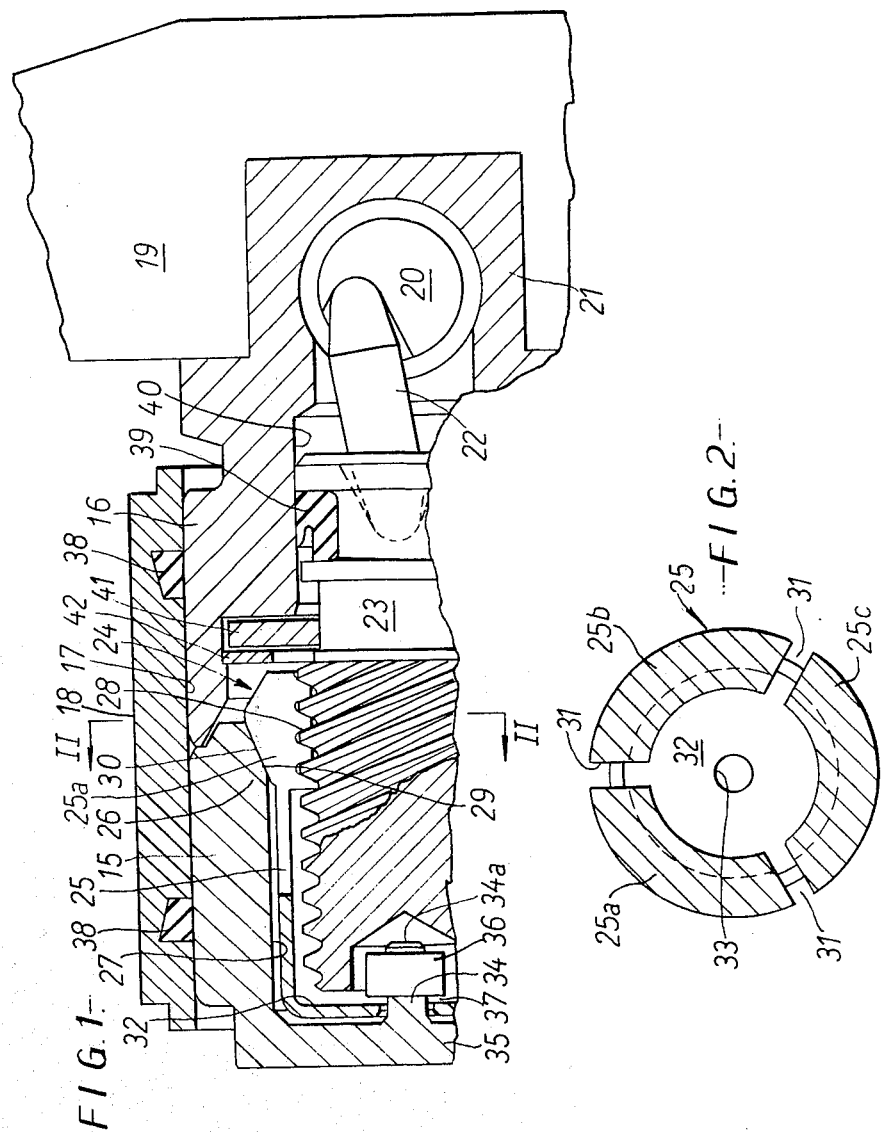

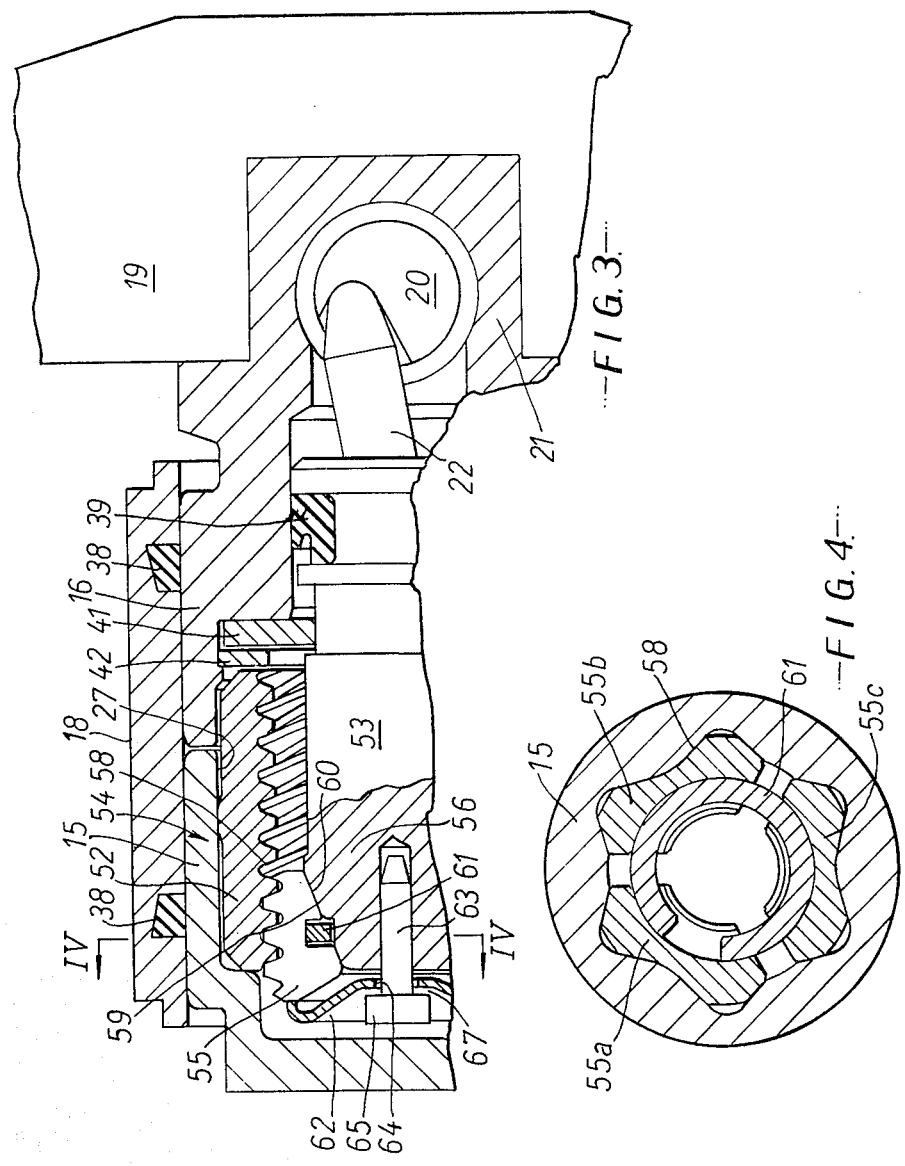

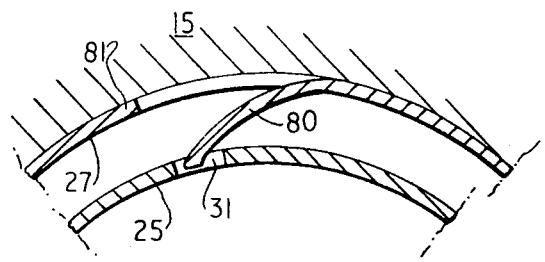
—FIG.6.—
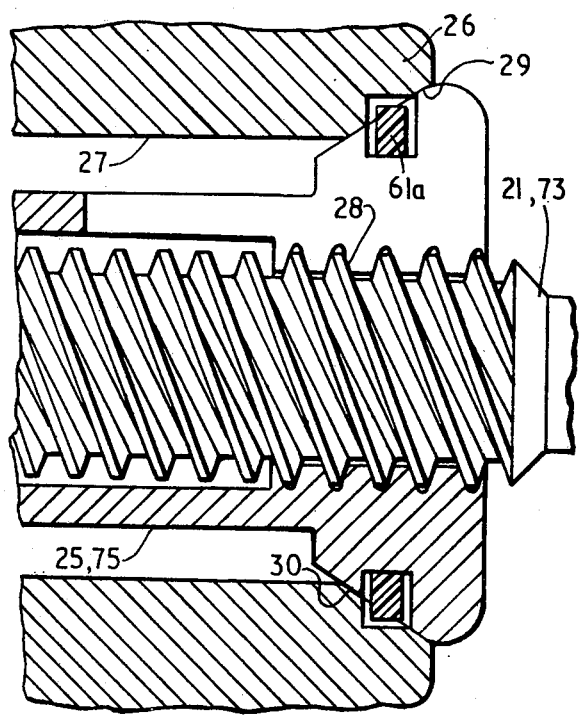
—FIG.7.—

BRAKE ADJUSTERS

The present invention relates to an automatic slack adjuster for vehicle brakes.

As is well known, it is desirable to limit the return travel of a brake actuating member, such as a hydraulic piston, of a vehicle brake system so that excessive pedal (or hand lever) travel will not be encountered the next time the brakes are applied. An automatic brake adjuster may be provided which comes into operation as a result of travel of such brake actuating member in the brake-applying direction in excess of the desired travel. Upon such excessive travel the adjuster adjusts the limit of return travel of said brake actuating member which occurs when the brakes are released.

In our British Pat. No. 1343111 there is described a slack adjuster for a vehicle brake system which includes first and second members having a reversible screwthread connection (as hereinafter defined) therebetween such that in one direction of axial load between said first and second members relative rotation is effected therebetween, and a third member, said second and third members having interengageable wedging surface thereon effective upon axial loading in a direction opposite to said one direction for urging relative radial displacement between said first and second members to hold the first and second members in frictional engagement with one another at said reversible screw-thread connection to prevent relative rotation therebetween. To prevent undesired reverse rotation under so-called "knock-back" when the brake is in its released state, a pawl and ratchet mechanism may be fitted at least indirectly between the screw-threaded members.

According to one feature of the present invention the arrangement is such as to inhibit undesired reverse rotation at the reversible screw-thread connection whilst avoiding or reducing the necessity for one way clutches.

According to another feature of the present invention the first and second members are spring biassed toward one another at said reversible screw-thread connection in a substantially radial direction to inhibit unintentional reverse rotation in other circumstances.

In one embodiment the second member comprises a longitudinally slit tubular member defining springy fingers having the reversible screw-thread thereon and inherently biassed radially against the first member.

In another embodiment the second member comprises an arcuate segment and at least one other and preferably at least two other such segments are provided, circumferentially spaced with respect to one another, separate spring means being provided to radially bias said segments against said first member.

Advantageously the adjuster is associated with a hydraulic actuator and an auxiliary mechanical actuator, such as a handbrake acts through the adjuster.

Means may be provided for rendering the adjuster load insensitive, i.e., for preventing relative rotation at the reversible screw-thread connection responsively to brake deflection. To this end the second adjuster member can be formed with an auxiliary piston which is urged by hydraulic brake pressure in a direction to urge the wedging surfaces together and which is biased by a spring in the opposite direction. The spring is overcome by the brake pressure at a relatively low value thereof, whereby no adjustment can take place at higher pressures which may be accompanied by brake deflection.

The invention is further described, by way of example, with reference to the accompanying drawings, in which:

FIG. 1 is a fragmentary sectional view of a first embodiment of slack adjuster in accordance with the invention, FIG. 2 is a section on the line II—II of FIG. 1, FIG. 3 is a fragmentary sectional view of a second embodiment of slack adjuster in accordance with the invention, FIG. 4 is a section on the line IV—IV of FIG. 3, FIG. 5 is a sectional view of a third embodiment of slack adjuster in accordance with the invention, FIG. 6 is a detail sectional view on the line VI—VI of FIG. 1 to illustrate a modification, and FIG. 7 is a sectional detail of a modification to FIGS. 1 and 5.

FIGS. 1, 3 and 5 show slack adjusters fitted to a hydraulic actuator of a reaction type caliper disc brake of the kind described in British Pat. Specification Nos. 1,075,371 and 1,147,639.

In the said reaction type caliper disc brake the hydraulic actuator is disposed between a first brake pad and a yoke arranged for displacement parallel to the axis of the disc. The yoke extends to the side of the disc remote from the first brake pad and supports a second brake pad in opposition to said first brake pad. Expansion of the hydraulic actuator urges the first brake pad against one face of the disc and urges the yoke in the opposite direction so that the second brake pad is pressed against the other face of the disc.

It will be appreciated that the actual displacement of the first pad relative to the second pad between braking engagement with the disc and the disengaged positions of the pads is very small in this type of brake system and the direction of force applied by the hydraulic actuator is perpendicular to the plane of the brake disc.

Referring to FIG. 1 of the drawings, a hydraulic actuator comprises a pair of opposed pistons 15 and 16 slidable in a through bore 17 in a fixed body member 18. The body member 18 is mounted at one side of a disc (not shown) and the piston 15 acts on a friction pad co-operating with that side of the disc. The piston 16 acts on a yoke 19 which is slidably supported on the body member 18 (as can be understood more fully from the abovementioned Patent Specifications) and which acts on an indirectly operated friction pad at the other side of the disc.

An auxiliary mechanical actuator is also provided and comprises a cam 20 which is journalled in an extension 21 on the piston 16 and which acts through a dolly 22 on a strut 23. The strut 23 forms part of an automatic adjuster 24 which includes a slit nut 25. The adjuster 24 is partially accommodated within a blind bore 27 in the piston 15.

The nut 25 has a normally reversible screw-thread connection 28 with the strut 23. A reversible screw-thread connection is a connection such that axial displacement of the nut relative to the screw causes relative rotation therebetween and vice versa. Whether a screw thread connection is reversible or not depends upon the pitch and flank angles of the thread and the coefficient of friction between the nut and the screw. The inner end of the piston is formed as a wedge member 26 which has an internal frusto-conical surface 29 co-operating with complementary surfaces 30 on the springy fingers 25a, 25b and 25c of the slit nut 25 in the region of the reversible screwthread connection 28.

As can be seen from FIGS. 1 and 2, the slit nut 25 comprises a cup-shaped member whose wall is provided with three longitudinal slits 31 which extend through and well beyond the reversible screw thread connection 28. These slits divide the screw-threaded portion of the nut into three springy fingers 25a, 25b and 25c. The free state dimensions of the slit nut 25 are such that the springy fingers press radially inwardly against the strut 23. The base 32 of the cup-shaped nut 25 has a small central hole 33 through which a projection 34 extends from the end wall 35 of the piston 15. A wheel 36 is journalled on a reduced diameter portion of the projection 34 and is rotatably retained thereon by peening over the end 34a of the projection 34. The wheel 36 is of larger diameter than the hole 33 so that the nut 25 is held captive in the piston 15. When the wedging surfaces 29 and 30 are in engagement with one another, as in the resting position as shown, there is an axial clearance 37 between the base 32 of the nut 25 and the left hand side of the wheel 36, this clearance determining the normal brake slack.

Seals 38 seal the pistons 15 and 16 to the bore 17 and a seal 39 seals the strut 23 to a bore 40 in the indirectly operating piston 16. A locating plate 41 held in place in the piston 16 by a spring ring 42 prevents the strut 23 from turning relative to the piston 16 which is itself prevented from turning by the yoke 19. For this purpose the locating plate 41 has a spigot (not shown) engaging in the piston 16 and has a key engaging in a keyway (not shown) in the strut 23.

During hydraulic operation of the brake, the hydraulic fluid is applied to the space between the pistons 15 and 16 to urge these pistons apart and thereby urge the hydraulic pads against the opposite sides of the disc. The hydraulic pressure acts on the left hand end of the strut 23 to urge this strut to the right relative to the piston 15 and thereby holds this strut in abutment with the dolly 22, the cam 20 being held in its illustrated position by stop means (not shown). The clearance 37 between the wheel 36 and the base 32 of the nut 25 is sufficient to permit relative axial movement between the two pistons 15 and 16 without affecting the screw-thread connection 28 during normal piston travel. On the other hand, if there is excessive piston travel this clearance 37 is taken up and the strut 23 is prevented by the wheel 36 from moving further to the right whereby the nut 25 is caused to turn on the strut 23 by the reversible screw-thread connection 28, thereby effecting automatic adjustment so that the next time the pistons 15 and 16 come to rest they cannot approach quite so closely towards one another. The wheel 36 rotates with the nut 25 and acts as a thrust bearing whose diameter (the diameter of the peened over end 34a) is small compared with the diameter of the reversible screw-thread connection 28. The wheel 36 therefore offers relatively low resistance to rotation of the nut 25. Nevertheless the projection 34 can be peened over at 34a so tightly that the wheel 36 cannot rotate since the diameter of the wheel 36 engaged by the base 32 of the nut 25 is itself small compared with the diameter of the reversible screw-thread connection 28.

When the handbrake is applied, the cam 20 is turned in an anti-clockwise direction thereby urging the piston 15 to the left relative to the piston 16 so that the brake pads are applied as before. However, in this case the brake-applying force is transmitted through the automatic adjuster, i.e. between the strut 23 and the nut 25. Since the screw-thread connection 28 is a reversible connection means must be provided for preventing relative rotation upon handbrake application and this means comprises the wedging surfaces 29 and 30. The brake-applying force is transmitted between the three springy fingers 25a, and 25b, and 25c of the slit nut 25 and the wedge member 26 at these wedging surfaces which thereby urge the three springy fingers 25a, 25b and 25c towards one another thereby clamping the strut 23 therebetween and preventing relative axial movement and consequent relative rotation. The wedging surfaces 29 and 30 themselves act as a friction clutch further ensuring that the nut 25 cannot rotate.

The spring bias by which the springy fingers 25a, 25b and 25c press against the strut 23 at the reversible screw thread connection 28 serves to prevent the nut 25 from rotating in the reverse direction due to "knock back" and due to vibration. However the friction developed at the screw thread connection 28 due to this spring bias is insufficient to adversely affect the ability of the reversible screw-thread connection 28 to cause the nut 25 to rotate.

Whilst the slit nut 25 is illustrated as having three springy fingers, they may be lesser or greater in number e.g. two or four. Alternatively, the nut need not be slit; rather it may be longitudinally split into two or more segments biassed by separate spring means against the strut 23. A further possibility is for the strut to be split or slit instead of the nut. In this case the split or slit strut is hollow and the wedge member extends inside the split or slit strut and acts radially outwardly on the strut.

These alternatives are illustrated by the embodiment of the invention shown in FIGS. 3 and 4 of the drawings. In these figures, parts like those of FIGS. 1 and 2 or having an equivalent function are denoted by like reference numerals. The cam 20 acts through the dolly 22 on one end of a strut 53 forming part of an automatic adjuster 54 which includes a split screw 55 having a reversible screw thread connection 58 with an elongate nut 52. The nut 52 is a force-fit in the blind bore 27 in the piston 15 and is thus effectively part of this piston, which is nonrotatable. The split screw 55 is hollow and comprises three separate segments 55a, 55b, and 55c. The left hand end of the strut 53 is formed as a wedge member 56 which has an external frusto-conical wedging surface 59 co-operating with complementary surfaces 60 inside the screw segments 55a, 55b and 55c in the region of the reversible screw-thread connection 58.

The screw segments 55a, 55b and 55c are biassed radially outwardly against the nut 52 by a split spring ring 61 received in grooves inside the screw segments. A washer 62 is held captive on the left hand end of the strut 53 by a nail 63 force-fitted in a bore in the strut 53 and acts on the split screw 55. The nail 63 passes through a hole 64 in the washer 62 and has a head 65 of slightly larger diameter than the hole 64. The nail 63 is fitted to provide a clearance 67 between the head 65 and the washer 62 in the released state of the brake, which clearance determines the normal brake slack.

The adjusting 54 operates in the same way as the adjuster 24 of FIGS. 1 and 2. The head 65 has a diameter which is small compared with the diameter of the reversible screw-thread connection 58 and provides a low friction thrust bearing permitting the washer 62 and the split nut 65 to rotate when automatic adjustment is taking place. The spring 61 creates friction at the reversible screw-thread connection 58 to inhibit reverse rotation of the screw 55 under knock-back but not sufficient to impair automatic adjustment The cam 20 acts through the wedging surfaces 59, 60 to prevent reverse rotation of the screw 55 during handbrake operation.

The embodiment of FIGS. 3 and 4 is even more resistant to knock-back than the embodiment of FIGS. 1 and 2. A blow applied to the piston 15 is transmitted to the nut 25 in FIG. 1 and the bounce effect at the friction surfaces 29 and 30 can momentarily displace the nut 25 to the right to temporarily separate the friction surfaces and reduce the resistance to rotation of the nut 25. In FIG. 3, a blow applied to the piston 15 similarly can momentarily displace the nut 55 to the right but this tends to urge the friction surface 59 and 60 more tightly together. Knock-back from the indirectly operated brake pad is less of a problem as the knock-back forces are dissipated considerably by the yoke 19, the piston 16, the cam 20 and the dolly 22.

Whilst the springiness of the fingers 25a, 25b and 25c and the provision of the spring 61 can avoid the use of a one way clutch to prevent reverse rotation under knock-back conditions, a one-way clutch can still be provided as an extra precaution. For example as shown in FIG. 6, a ratchet and pawl arrangement can be provided between the cup-shaped nut 25 and the piston 15. The springy fingers 25a, 25b and 25c can form the ratchet and the pawls 80 can be formed in an annular member 81 force-fitted in the bow 27 in the piston 15. By making the number of ratchet teeth and the number of pawls such that they do not have a common factor the ratchet and pawl arrangement can have fine steps without it being necessary to provide a large number of pawls and ratchet teeth. For example, with three ratchet teeth formed by the three springy fingers, eleven pawls, equi-spaced, can be provided to provide thirty three steps per revolution.

It will be noted that, if the threads of the reversible screw-thread connection 28 or 58 are made more square, i.e. with a steeper flank angle, the flank angle being the angle the thread flank makes with the longitudinal axis, the springiness of the fingers 25a, 25b and 25c or the strength of the spring 61 can be reduced because of the wedging effect between the screw threads under the radial loading A disadvantage of the automatic adjusters shown in FIGS. 1 to 4 of the drawings is that they are susceptible to overadjustment due to occurrence of caliper deflection upon heavy brake application. FIG. 5 of the drawings shows a further modification of the embodiment of FIGS. 1 and 2 which renders the automatic adjuster load insensitive, i.e. makes it non-responsive to brake deflection.

In FIG. 5 parts like those of FIGS. 1 and 2 are shown by like reference numerals. The embodiment of FIG. 5 has a slit nut 75 provided with three longitudinal slits substantially as shown in FIG. 2. The slit nut 75 is formed at its left hand end as a piston 75a which is slidably received in the blind bore 27 in the piston 15 and is sealed thereto by a resilient sealing ring 70. The hydraulic pressure applied to the space between the pistons 15 and 16 thereby acts to the left on the slit nut 75 which has the external wedging surface 30 co-operating with the internal conical wedging surface 29 in the wedge member 26 forming an integral part of the piston 15. In the embodiment of FIG. 5 a strut 73 having the reversible screw thread connection 28 with the nut 75 is disposed to be abutted by a plunger 73a which is sealed by the sealing ring 39 to the bore 40 in the piston 16 and which is acted upon by the cam 20 via the dolly 22. A spring abutment plate 71 has a projection 71a which extends into a blind bore in the piston 16 to prevent the plate 71 from rotating and is keyed by means (not shown) to the strut 73 to prevent the strut from rotating. The strut 73 has a head 73b which co-operates with the plate 71 and with which the plunger 73a co-operates. A compression spring 76 is disposed between the plate 71 and a support ring 77 held in place in a widened bore portion 40a of the piston 16 by a spring ring 72.

The drawing shows the brake actuator in the resting position in which the plate 71 is held by the spring 76 against the plunger 73a. The head 73b of the strut 73 is accommodated in the plunger 73a so that it has limited axial travel between a rightward position in abutment with the plunger 73a and a leftward position in abutment with the plate 71. Further leftward movement of the strut 73 and with it the head 73b displaces the plate 71 with consequent compression of the spring 76. It will therefore be seen that once the head 73b engages the plate 71 the force of the spring 76 biases the slit nut 75 via the reversible screw thread connection 28 in opposition to the hydraulic pressure acting on the slit nut. The spring 76 is so dimensioned in relation to the diameter of the piston portion 75a of the slit nut 75 that at a relatively low brake pressure, at which the braking force is slight and the caliper deflection is negligible, hydraulic pressure overcomes the spring 76 and holds the wedging surfaces 29 and 30 in engagement with one another.

The axial travel permitted between the head 73b of the strut 73 and the plate 71 determines the nominal brake slack. If some lining wear takes place whilst the brake is heavily applied, no automatic adjustment can take place immediately because the fluid pressure is holding the wedging surfaces 29 and 30 in engagement with one another and thereby increasing the friction at the reversible screw-thread connection 28 so that relative rotation cannot take place. Upon brake release, the hydraulic pressure reduces to the above mentioned relatively low value before the plate 71 comes into abutment with the plunger 73a because of the lining wear which has taken place. As the hydraulic pressure falls still further, the spring 76 is able to overcome the hydraulic pressure, thus tending to separate the wedging surfaces 29 and 30. The resistance to relative rotation at the reversible screw-thread connection 28 is thereby reduced so that the split nut 75 is turned under the effect of the rightward force of the spring 76 and the leftward force due to the residual pressure acting on the piston portion 75a. The necessary adjustment is therefore effected automatically in order to take up the additional slack resulting from the lining wear. Since this adjustment operation only commences when the brake pressure has fallen to a residual value the caliper deflection has already substantially disappeared and therefore cannot lead to over-adjustment.

In order to supplement the force by which the springy fingers 25a, 25b and 25c of the slit nut 25 of FIG. 1 and the slit nut 75 of FIG. 5 press resiliently against the strut 23 or 73 at the reversible the screw thread connection 28, a spring ring 61a can be arranged in an external annular groove in the slit nut at its slit end as shown in FIG. 7. Such a spring ring is similar to the spring ring 61 shown in FIGS. 3 and 4 but acts radially inwardly on the springy fingers. The external annular groove receiving the spring ring 61a is preferably in the frusto-conical surface 30 on the springy fingers and the wedging surface 29 is shown recessed to provide clearance for the spring ring. Such an arrangement increases the friction at the reversible screw thread connection 28 to further reduce the risk of undesired rotation of the nut. This construction may be preferred to a thickening of the springy fingers to obtain an increased spring force since the latter solution might entail an increase in the axial length of the slit nut to retain the desired amount of possible radial deflection of the springy fingers.

An advantage of rendering the automatic adjuster insensitive to load is that the nominal brake slack can be reduced since no account need be taken of possible overadjustment due to caliper deflection. This renders the mechanical operation of the brake more positive, i.e. in the case of a hand brake the lever travel to apply the brake is reduced.

I claim:

1. A slack adjuster for a vehicle brake system which includes first and second members having a reversible screw-thread connection therebetween for effecting relative rotation therebetween in one direction of axial load between said first and second members, said second member having a plurality of individual portions disposed circumferentially with respect to said first member and having respective portions of said screw-thread connection, a third member, each of said portions of said second member and said third member having interengageable wedging surfaces thereon effective upon axial loading in a direction opposite to said one direction for urging relative radial displacement between said first member and said portions of said second member to hold the first and second members in frictional engagement with one another at said reversible screw-thread connection to prevent reverse relative rotation therebetween, and spring means effective in a radial direction on each of said portions of said second member to bias such portions towards said first member at said reversible screw-thread connection to inhibit undesired rotation at said reversible screw-thread connection.

2. A slack adjuster according to claim 1 in which said second member comprises a longitudinally slit tubular member defining said portions of said second member as fingers having the reversible screw-thread thereon and in which said spring biasing means comprises inherent resilience in said fingers biasing said fingers radially against said first member.

3. A slack adjuster according to claim 1 in which said portions of said second member comprise separate arcuate segments, said segments being circumferentially spaced with respect to one another, and in which said spring means acts radially on said segments to bias the latter against said first member.

4. A slack adjuster according to claim 1 in which said reversible screw-thread connection comprises a male thread on said first member and a female thread on said second member and in which said wedging surfaces comprise an external surface on said second member radially outwards of said female thread and an internal surface in said third member, into which the second member extends.

5. A slack adjuster according to claim 1 in which said reversible screw thread connection comprises a female thread in said first member and a male thread on said second member, said second member being hollow, and in which said wedging surfaces comprise an internal surface in said second member and an external surface on said third member, which extends into said second member.

6. A slack adjuster according to claim 1 including means defining an axial lost-motion connection between said second and third members to determine the desired brake slack, said lost motion connection offering low resistance to rotation of said second member when the wedging surfaces are parted and the slack is taken up, whereby not to inhibit relative rotation at said reversible screw-thread connection.

7. A slack adjuster according to claim 1 which is fitted to a hydraulic actuator having first and second non-rotatable components movable away from one another upon application of hydraulic pressure therebetween and in which one of said first and third members is fixed relatively to said first hydraulic actuator component and the other of said first and third members is associated with said second hydraulic actuator component, means being included to prevent relative rotation between said other members and said second component.

8. A slack adjuster according to claim 7 which further includes an auxiliary mechanical actuator in said second hydraulic actuator component to act on said other of said first and third members.

9. A slack adjuster according to claim 1 in which means are provided for preventing relative rotation at said reversible screw-thread connection responsively to brake deflection.

10. A slack adjuster according to claim 9 which is fitted to a hydraulic actuator having first and second non-rotatable components movable away from one another upon application of hydraulic pressure therebetween, and in which said third member is fixed relatively to said first hydraulic actuator component and said first member is associated with said second hydraulic actuator component, means being provided to prevent relative rotation between said first member and said second component, and in which said means responsive to brake deflection comprises means slidably sealing said second member to said one hydraulic actuator component, whereby said hydraulic pressure acts on said second member in a first direction to urge said wedging surfaces together, and spring means acting to bias said second member in a second direction opposite to said first direction, said sealing means and said spring means being dimensioned relatively to one another so that said hydraulic pressure acting on said second member overcomes said spring means at a relatively low value of said hydraulic pressure.

11. A slack adjuster according to claim 10 in which said spring means is disposed to act on said first member and thereby via said reversible screw-thread connection to bias said second member.

12. A slack adjuster according to claim 11 in which said spring means is supported against said second hydraulic actuator component.

13. A slack adjuster according to claim 11 in which plate means is disposed adjacent said second actuator component and said spring means acts against said plate means in a direction towards said second hydraulic actuator component, and in which said first member has means thereon cooperating with said plate means to permit limited axial travel of said first member relative to said plate means in order to determine the desired brake slack.

14. A slack adjuster according to claim 10 which further includes an auxiliary mechanical actuator in said second hydraulic actuator component to act on said first member.

15. A slack adjuster according to claim 2 in which spring biasing means further comprises separate spring means acting radially on said fingers to supplement the inherent resilience therein biasing said fingers radially against said first member.

16. A slack adjuster for a vehicle brake system which includes first and second members having a reversible screw thread connection therebetween for effecting relative rotation therebetween in one direction of axial load between said first and second members, said second member comprising a longitudinally slit tubular member defining fingers having the reversible screwthread thereon, and a third member, said fingers of said second members and said third member having interengageable wedging surfaces thereon effective upon axial loading in a direction opposite to said one direction for urging relative radial displacement between said first and second members to hold the first and second members in frictional engagement with one another at said reversible screw-thread connection to prevent reverse relative rotation therebetween, said fingers having inherent resilience to bias said fingers in a substantially radial direction towards said first member at said reversible screw-thread connection to inhibit undesired rotation at said reversible screw-thread connection.

17. A slack adjuster for a vehicle brake system which includes a first and a plurality of second members having a reversible screw-thread connection therebetween for effecting relative rotation therebetween in one direction of axial load between said first and second members, each of said second members comprising an arcuate segment, said segments being circumferentially spaced with respect to one another and having a respective portion of said screw-thread connection thereon, a third member, each of said second members and said third member having interengageable wedging surfaces thereon effective upon axial loading in a direction opposite to said one direction for urging relative radial displacement between said first and each of said second members to hold the first and second members in frictional engagement with one another at said reversible screwthread connection to prevent reverse relative rotation therebetween, and spring means acting separately on each of said second members in a substantially radial direction to bias the latter towards said first member at said reversible screw-thread connection to inhibit undesired rotation at said reversible screwthread connection.

18. A slack adjuster for a vehicle brake system which includes first and second members having a reversible screw-threaded connection therebetween for effecting relative rotation therebetween in one direction of axial load between said first and second members, a third member, said second and third members having interengageable wedging surfaces thereon effective upon axial loading in a direction opposite to said one direction for urging relative radial displacement between said first and second members to hold the first and second members in frictional engagement with one another at said reversible screw-thread connection to prevent reverse relative rotation therebetween, means spring biasing said first and second members towards one another at said reversible screw-thread connection in a substantially radial direction to inhibit undesired rotation at said reversible screwthread connection, and means defining an axial lostmotion connection between said second and third members to determine the desired brake slack, said lost motion connection offering low resistance to rotation of said second member when the wedging surfaces are parted and the slack is taken up, whereby not to inhibit relative rotation at said reversible screw-thread connection.

19. A slack adjuster according to claim 7 in which said hydraulic actuator forms part of a reaction type disc brake having a caliper and directly and indirectly operated brake pad assemblies and in which said first actuator component is arranged to act on said directly operated brake pad assembly, said second actuator component is arranged to act on said caliper and said caliper acts on said indirectly operated brake pad assembly.

20. A slack adjuster according to claim 19 in which said first adjuster member is fixed relative to said first actuator component and said third adjuster member is associated with said second actuator component.

21. A slack adjuster according to claim 20 in which said disc brake further comprises an auxiliary mechanical actuator in said second hydraulic actuator component and acting on said third adjuster member.

22. A slack adjuster according to claim 1 in which a one-way clutch is operatively arranged between said second member and one of said first and third members to prevent reverse rotation of said second member.

23. A slack adjuster according to claim 2 in which a ratchet and pawl device is operatively arranged between said second members and one of said first and third members to prevent reverse rotation of said second member, the ratchet of said ratchet and pawl device being comprised by said fingers.

* * * * *